United States Patent
Tian et al.

(10) Patent No.: US 12,379,609 B1
(45) Date of Patent: Aug. 5, 2025

(54) ENCIRCLING EYEGLASS TEMPLE WITH DEFORMATION STRUCTURE

(71) Applicant: WENZHOU OUHAI DONGTIAN GLASSES MANUFACTURING CO., LTD, Wenzhou (CN)

(72) Inventors: Zhidong Tian, Wenzhou (CN); Hongwu Lv, Wenzhou (CN)

(73) Assignee: WENZHOU OUHAI DONGTIAN GLASSES MANUFACTURING CO., LTD, Wenzhou (CN)

( * ) Notice: Subject to any disclaimer, the term of this patent is extended or adjusted under 35 U.S.C. 154(b) by 0 days.

(21) Appl. No.: 19/001,035

(22) Filed: Dec. 24, 2024

(30) Foreign Application Priority Data

Aug. 10, 2024 (CN) .......................... 202421933524.1

(51) Int. Cl.
*G02C 5/14* (2006.01)

(52) U.S. Cl.
CPC .................... *G02C 5/143* (2013.01)

(58) Field of Classification Search
CPC ....................................................... G02C 5/143
USPC .................................................... 351/41, 111
See application file for complete search history.

(56) References Cited

U.S. PATENT DOCUMENTS

| | | | | |
|---|---|---|---|---|
| 4,563,066 A | * | 1/1986 | Bononi | G02C 5/00 351/122 |
| 4,925,291 A | * | 5/1990 | Anger | G02C 5/16 351/122 |
| 5,087,117 A | * | 2/1992 | Steinwachs | G02C 5/143 351/122 |
| 7,185,982 B2 | * | 3/2007 | Dietz | G02C 11/00 351/111 |
| 7,712,896 B1 | * | 5/2010 | Lee | G02C 5/22 351/123 |

FOREIGN PATENT DOCUMENTS

| | | |
|---|---|---|
| CN | 205301741 U | 6/2016 |
| CN | 217007879 U | 7/2022 |
| CN | 219065907 U | 5/2023 |

* cited by examiner

*Primary Examiner* — Tuyen Tra
(74) *Attorney, Agent, or Firm* — Nitin Kaushik

(57) ABSTRACT

The present disclosure relates to an encircling eyeglass temple with a deformation structure, comprising an eyeglass temple body, wherein the deformation structure is installed at one end of the eyeglass temple body, the deformation structure comprises an elastic piece, the elastic piece is provided with an elastic piece fixing end that is fixedly connected to the eyeglass temple body, an elastic plane, and an upper elastic piece and a lower elastic piece that are arranged along the elastic plane, a hollow area is formed between the upper elastic piece and the lower elastic piece, terminal ends of the upper elastic piece and the lower elastic piece are intersected and are installed and fixed through a fixing member, and an externally convex and inwardly concave arc-shaped area serving as a deformation area under an external force is formed between the upper elastic piece and the lower elastic piece.

7 Claims, 9 Drawing Sheets

ENCIRCLING EYEGLASS TEMPLE WITH DEFORMATION STRUCTURE

CROSS-REFERENCE TO RELATED APPLICATIONS

The application claims priority to Chinese patent application No. 202421933524.1, filed on Aug. 10, 2024, the entire contents of which are incorporated herein by reference.

TECHNICAL FIELD

The present disclosure relates to the technical field of eyeglasses, in particular to an encircling eyeglass temple with a deformation structure.

BACKGROUND

Eyeglasses are a kind of optical device composed of lenses and frames, and are mainly used to improve vision, protect eyes, or serve as decorations. According to different uses, the eyeglasses can be divided into many types, including myopia glasses, farsighted glasses, presbyopic glasses, astigmatism glasses, plain glass spectacles, computer goggles, swimming goggles, etc.

Structures of the eyeglasses are usually composed of several main parts below: rims, bridges, lenses, nose pads (or leaves), temple bending, hinges, eyeglass temples, etc. These components work together to ensure that the eyeglasses can effectively correct vision problems and provide a comfortable wearing experience.

Most of existing eyeglass temples adopt fixed lengths or simple adjustable structures, which are mainly improvements in the aspect of length. For some different head shapes or sports places, many eyeglasses will fall off. In view of the problem, the solution proposes that the eyeglass temples are able to fit the head so as to increase different wearing needs of consumers.

In view of the above problems, the present disclosure proposes improvements.

SUMMARY

The present disclosure proposes an encircling eyeglass temple with a deformation structure, which solves the above problems existing in use processes in the prior art.

A technical solution of the present disclosure is implemented as follows:
an encircling eyeglass temple with a deformation structure comprises an eyeglass temple body, wherein the deformation structure is installed at one end of the eyeglass temple body, the deformation structure comprises an elastic piece, the elastic piece is provided with an elastic piece fixing end that is fixedly connected to the eyeglass temple body, an elastic plane, and an upper elastic piece and a lower elastic piece that are arranged along the elastic plane, a hollow area is formed between the upper elastic piece and the lower elastic piece, terminal ends of the upper elastic piece and the lower elastic piece are intersected and are installed and fixed through a fixing member, an externally convex and inwardly concave arc-shaped area serving as a deformation area under an external force is formed between the upper elastic piece and the lower elastic piece, and the elastic piece is sleeved with a tip.

As can be seen from the above solution, the solution mainly utilizes the structure between the upper elastic piece and the lower elastic piece, and utilizes the externally convex and inwardly concave arc-shaped area capable of allowing the upper elastic piece and the lower elastic piece to simultaneously perform deformation action outward or inward, thereby achieving the purpose of deformation.

Preferably, the elastic piece fixing end is connected to the eyeglass temple body through fasteners, and a plurality of convex rings are also installed at the elastic piece fixing end.

As can be seen from the above solution, the solution provides installation firmness.

Preferably, the fixing member adopts a threaded structural member.

As can be seen from the above solution, the threaded structural member may be a screw or a combination of a screw and a nut.

Preferably, the fixing member adopts a riveting member.

As can be seen from the above solution, the upper elastic piece and the lower elastic piece are connected directly by riveting.

Preferably, the elastic piece fixing end, the elastic plane, the upper elastic piece, and the lower elastic piece are all integrally formed by machining.

As can be seen from the above solution, a reinforcement effect is achieved.

Preferably, cross-sections of the upper elastic piece and the lower elastic piece located on the hollow area are in a symmetrical structure and are of an anti-falling reinforcement structure.

As can be seen from the above solution, the structure is in a water drop shape, and mainly achieves the purpose of tightly clamping a tail part of the temple on the head.

Preferably, both the upper elastic piece and the lower elastic piece adopt an arc-shaped structure, forming an encircling structure capable of encircling the back of the head.

As can be seen from the above solution, the purpose of the solution is to directly enable the upper elastic piece and the lower elastic piece to be encircled on the back of the head, thereby achieving the purpose of further improving prevention of falling.

Preferably, the terminal ends of the upper elastic piece and the lower elastic piece are integrally formed and extend to form a middle elastic piece that is bent to the hollow area, forming a three-elastic-piece structure.

In summary, beneficial effects of the present disclosure are as follows: according to the solution of the present disclosure as an improved solution, the eyeglass temple can be adjusted according to head shapes and sizes of different users, thereby providing better fit and comfort.

Meanwhile, through the unique design and structure, the eyeglass temple can be flexibly deformed to adapt to wearing needs of different users, thereby improving the wearing comfort and stability.

BRIEF DESCRIPTION OF DRAWINGS

In order to explain the technical solutions in implementations of the present disclosure or in the prior art more clearly, drawings required to be used in description of the implementations or the prior art are briefly introduced below. Obviously, the drawings described below are merely some implementations of the present disclosure, and for those of ordinary skill in the art, other drawings can also be obtained without exerting creative efforts according to these drawings.

DETAILED DESCRIPTION OF THE EMBODIMENTS

The technical solutions in implementations of the present disclosure will be described clearly and completely below in conjunction with FIG. 1 to FIG. 9 in implementations of the present disclosure. Obviously, the described implementations are merely a part of implementations of the present disclosure, rather than all of implementations. On the basis of the implementations of the present disclosure, all other implementations obtained by persons of ordinary skill in the art without exerting creative efforts should fall within the scope of protection of the present disclosure.

Implementation 1

Figure 1:
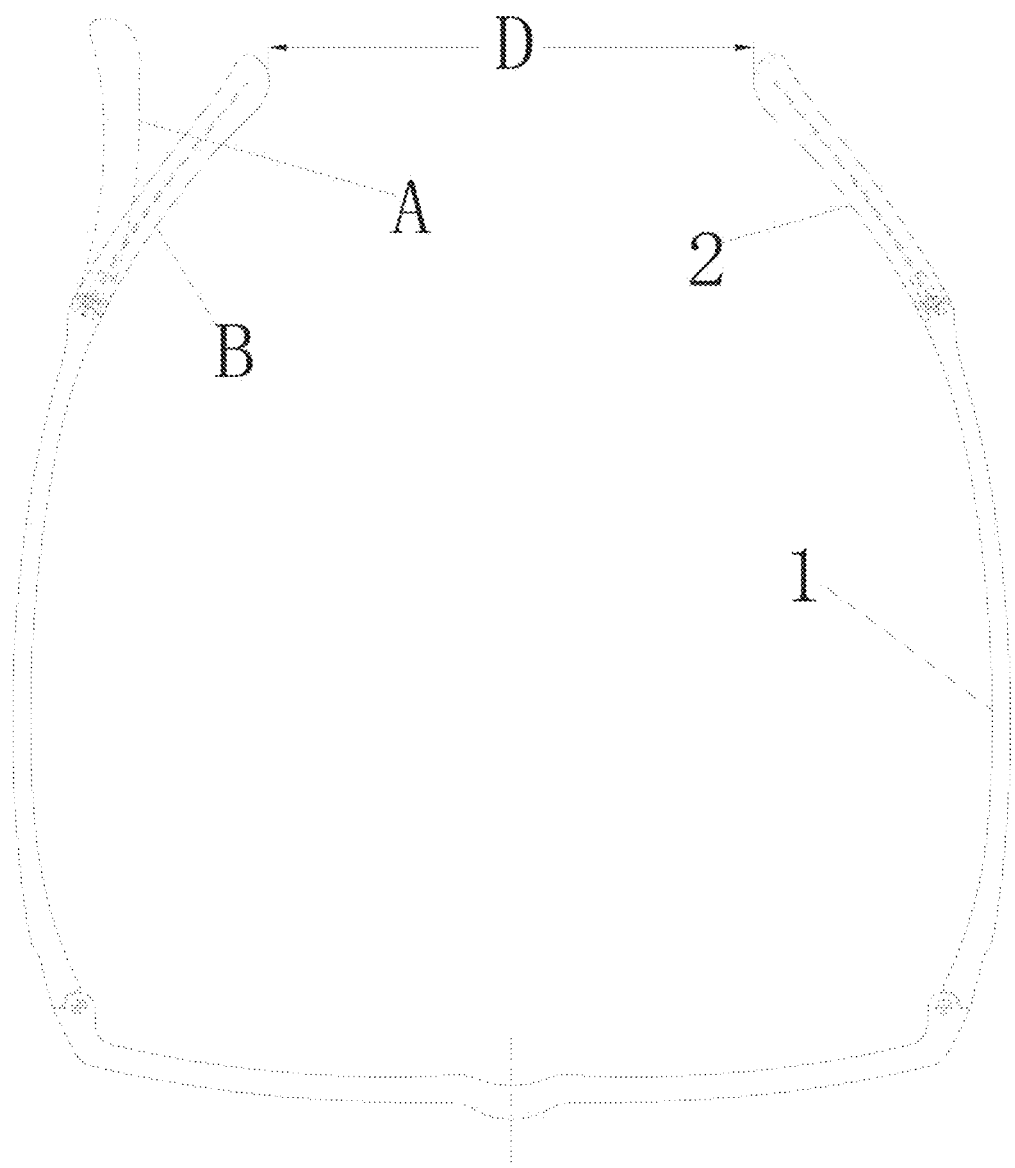
FIG. 1 is an overall structural schematic diagram of an encircling eyeglass temple with a deformation structure in Implementation 1 of the present disclosure.
Figure 2:
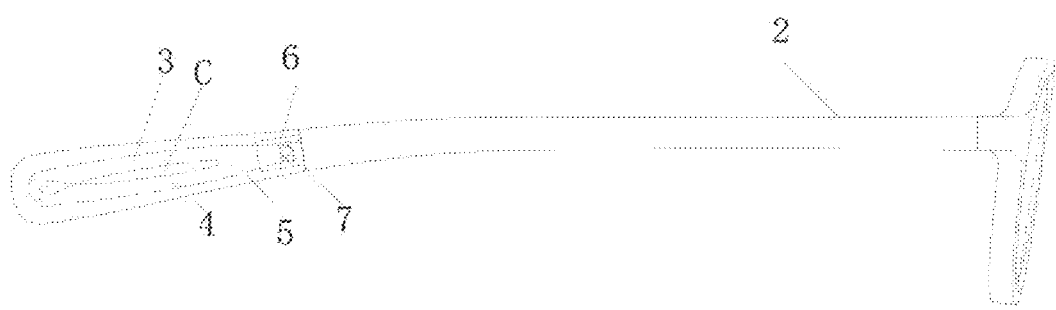
FIG. 2 is a side view of the encircling eyeglass temple with a deformation structure in Implementation 1.
Figure 3:
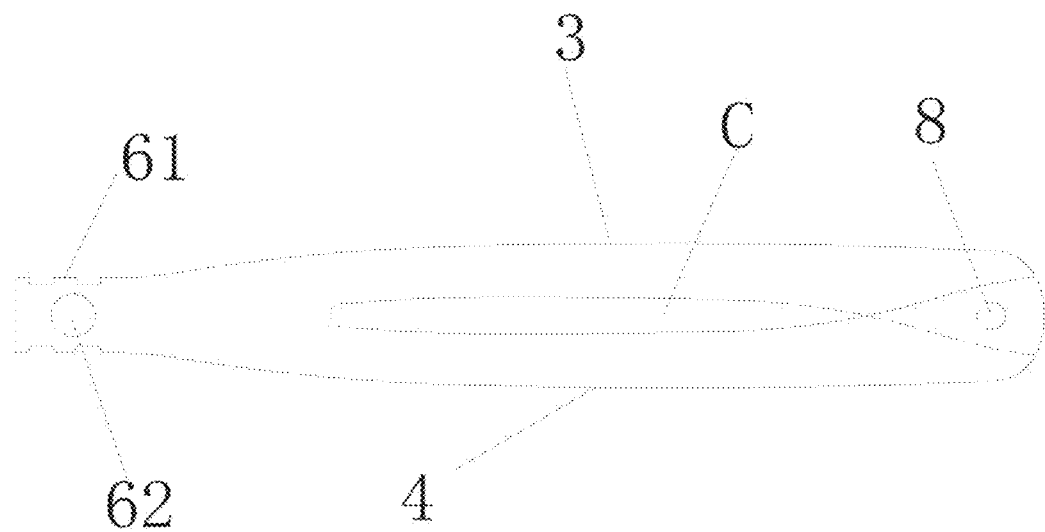
FIG. 3 is an installation schematic diagram of the deformation structure in Implementation 1.

As shown in FIG. 1 to FIG. 6, the present disclosure discloses an encircling eyeglass temple with a deformation structure, comprising an eyeglass temple body 1. The deformation structure 2 is installed at one end of the eyeglass temple body 1, and the deformation structure 2 comprises an elastic piece. Referring to FIG. 2 and FIG. 3, the elastic piece is provided with an elastic piece fixing end 6 that is fixedly connected to the eyeglass temple body, an elastic plane 5, and an upper elastic piece 3 and a lower elastic piece 4 that are arranged along the elastic plane. A hollow area C is formed between the upper elastic piece 3 and the lower elastic piece 4, terminal ends of the upper elastic piece 3 and the lower elastic piece 4 are intersected and are installed and fixed through a fixing member 8, an externally convex and inwardly concave arc-shaped area serving as a deformation area under an external force is formed between the upper elastic piece 3 and the lower elastic piece 4, an external convex of the externally convex and inwardly concave arc-shaped area is as shown in H in FIG. 4, an inward concave of the externally convex and inwardly concave arc-shaped area is as shown in G in FIG. 4, the elastic piece is sleeved with a tip, and the tip is arranged outside the deformation structure in a sleeving mode. Material selection for the tip: Soft, light and elastic materials, such as silica gel or memory foam, are selected, and these materials can effectively disperse pressure and reduce pressure on the ears when wearing for a long time.

The externally convex and inwardly concave arc-shaped area is utilized to allow the upper elastic piece and the lower elastic piece to simultaneously perform deformation actions outward or inward, thereby achieving the purpose of deformation in need. (With reference to a structure and action of a BB hair clip for hair)

In order to provide installation firmness, the elastic piece fixing end 6 is connected to the eyeglass temple body through fasteners 7, and a plurality of convex rings 61 are also installed at the elastic piece fixing end. Specifically: an installation hole 62 is formed at the elastic piece fixing end 6, the plurality of convex rings 61 are distributed on upper and lower sides of the installation hole 62 and then installed through the fasteners 7, and the purpose of the convex rings 61 is to strengthen the connection with the elastic piece fixing end 6.

In order to improve installation convenience of the product, the fixing member 8 adopts a threaded structural member. The threaded structural member may be a screw or a combination of a screw and a nut.

In order to improve installation firmness of the product, the fixing member adopts a riveting member 8. The terminal ends of the upper elastic piece and the lower elastic piece are connected directly by riveting.

In order to improve strength of the product, the elastic piece fixing end 6, the elastic plane 5, the upper elastic piece 3, and the lower elastic piece 4 are all integrally formed by machining.

Cross-sections of the upper elastic piece and the lower elastic piece located on the hollow area are in a symmetrical structure and are of an anti-falling reinforcement structure. As shown in FIG. 1, a normal state is as shown in A. When clamping is required, only the deformation structure 2 needs to be pressed to fit the back side of the head, thereby achieving the purpose of clamping. The eyeglass temple will not fall off in a movement process. Referring to FIG. 2 and FIG. 3, the structure is similar to a water drop shape, which also improves the aesthetics of the product.

Implementation 2

The present implementation is basically the same as Implementation 1, but has the difference that structures of the upper elastic piece and the lower elastic piece are optimized and improved. A specific solution is as follows: referring to FIG. 4 to FIG. 6, both the upper elastic piece and the lower elastic piece adopt an arc-shaped structure, forming an encircling structure capable of encircling the back of the head.

Figure 4:
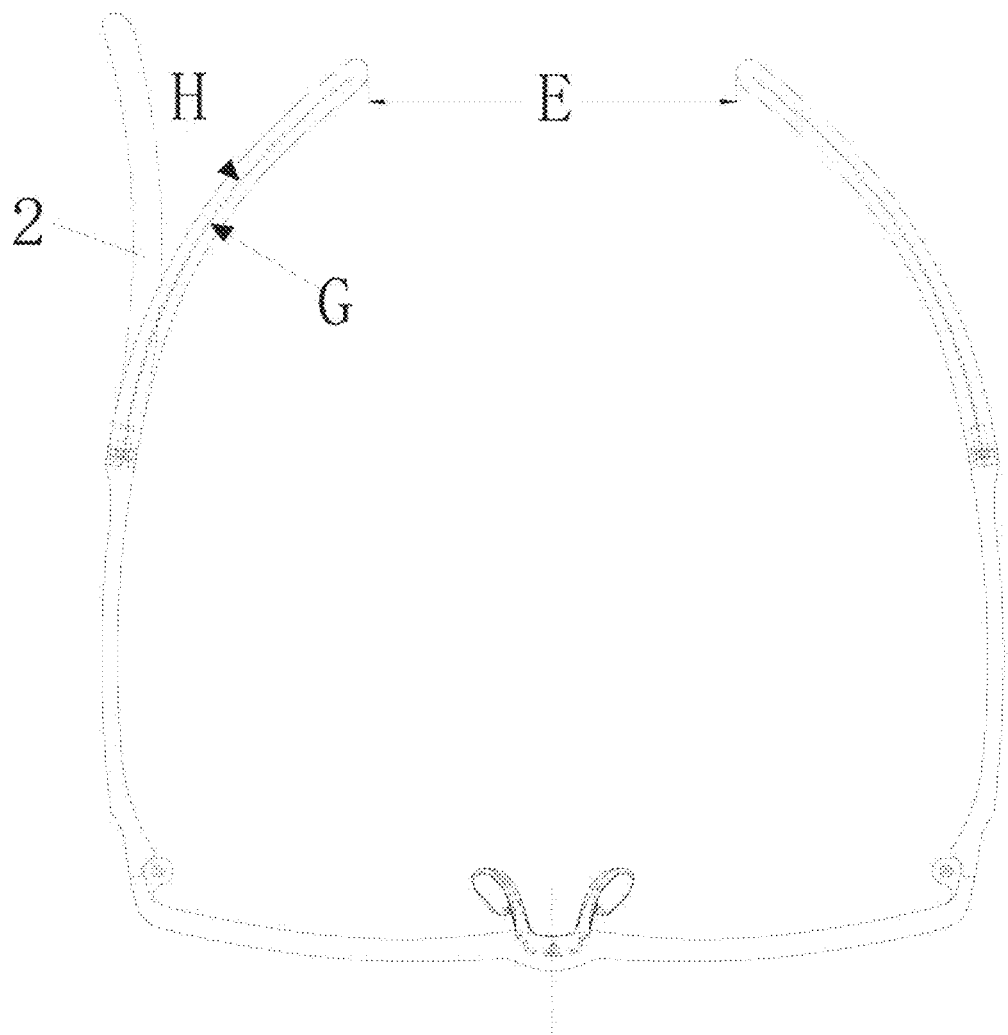
FIG. 4 is an overall structural schematic diagram of an encircling eyeglass temple with a deformation structure in Implementation 2 of the present disclosure.
Figure 5:
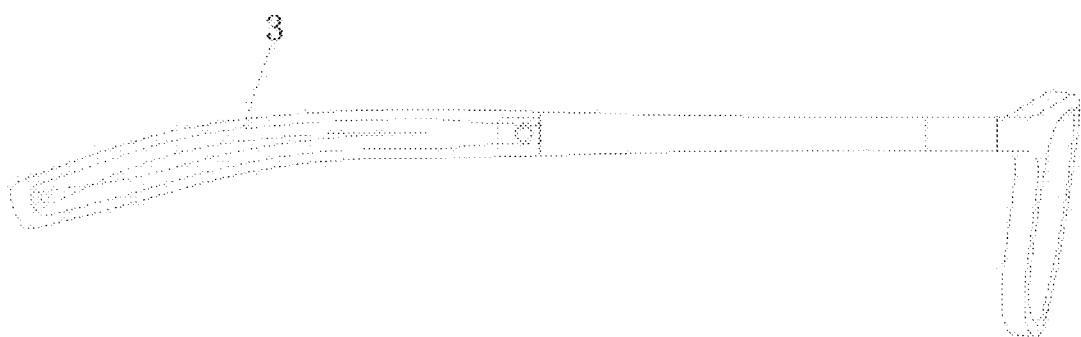
FIG. 5 is a side view of the encircling eyeglass temple with a deformation structure in Implementation 2.
Figure 6:
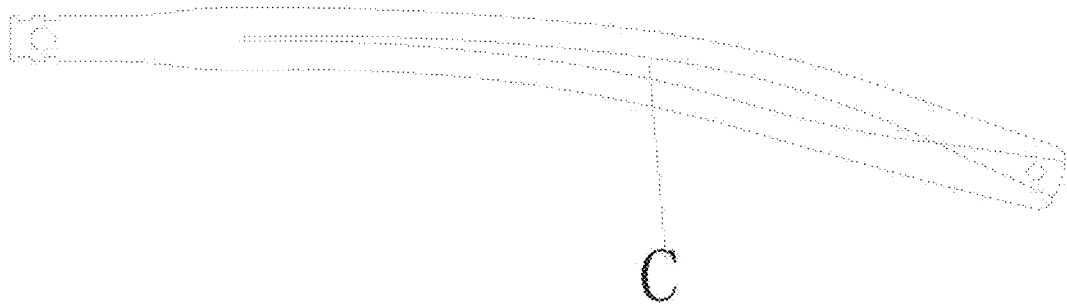
FIG. 6 is an installation schematic diagram of the deformation structure in Implementation 2.
Figure 7:
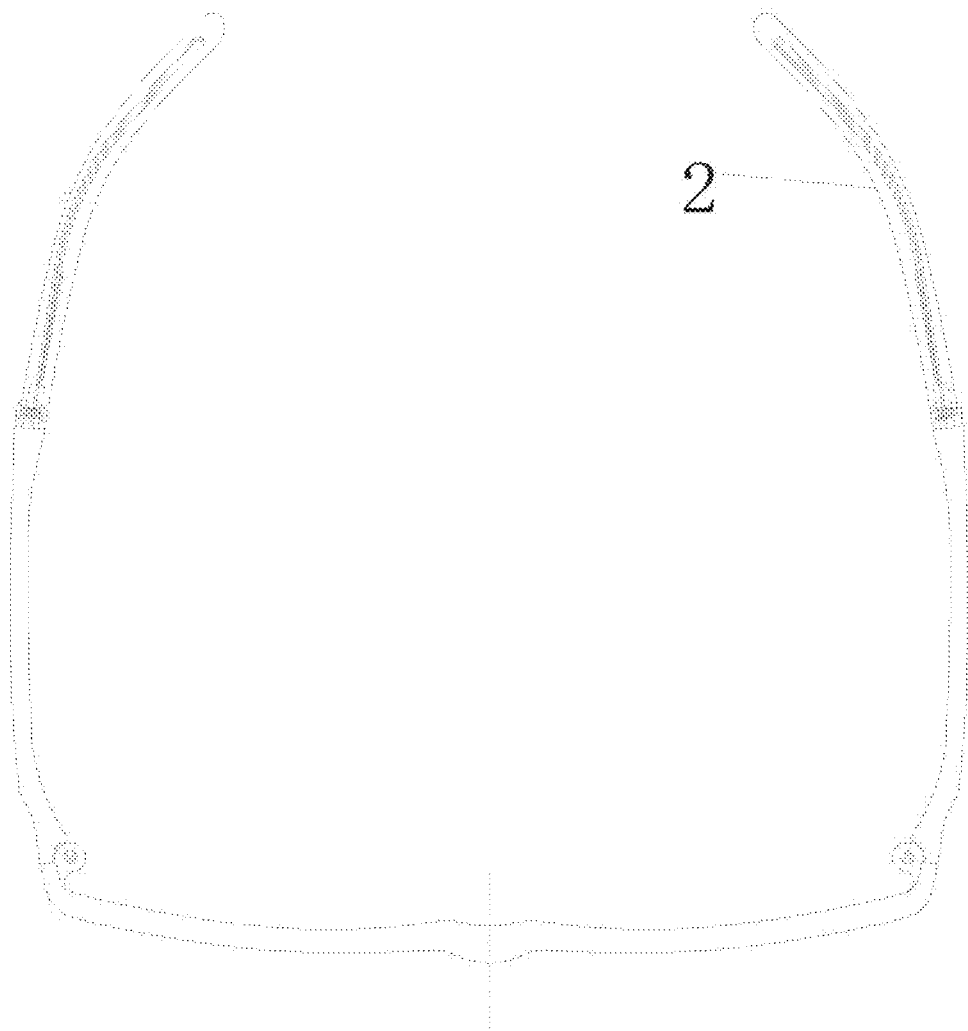
FIG. 7 is an overall structural schematic diagram of an encircling eyeglass temple with a deformation structure in Implementation 3.
Figure 8:
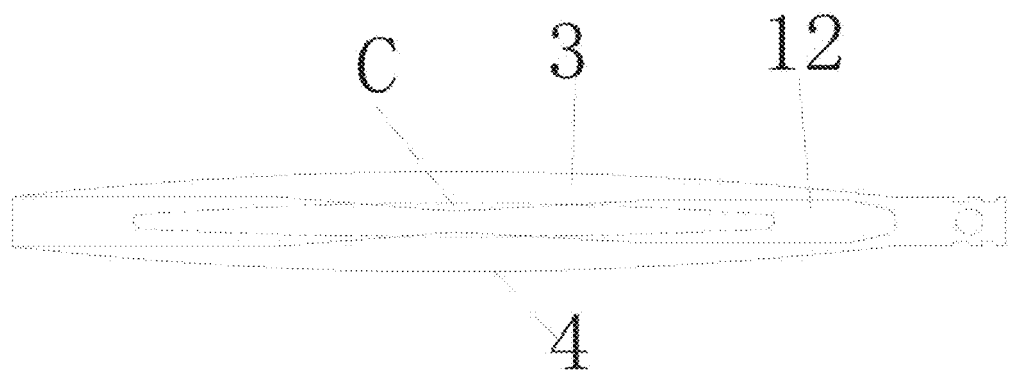
FIG. 8 is an overall structural schematic diagram of the deformation structure in Implementation 3.
Figure 9:
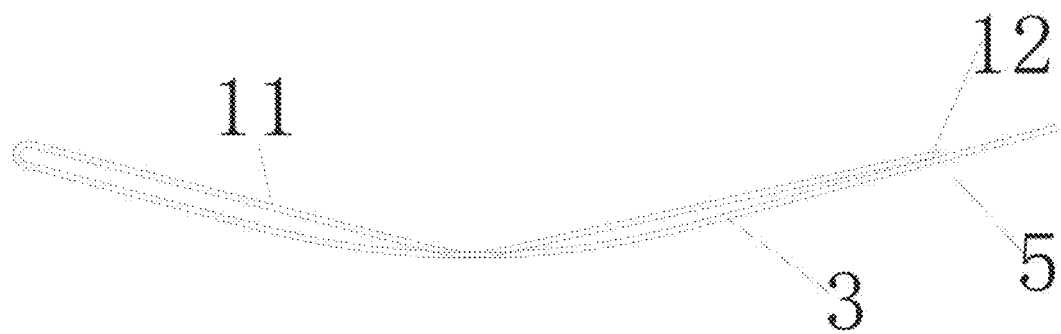
FIG. 9 is an upward view of FIG. 8.

The upper elastic piece and the lower elastic piece in the arc-shaped structure form a large arc-shaped encircling area. Referring to FIG. 4, a distance E between two deformation structures is smaller than a distance D between two deformation structures in FIG. 1. In this way, the eyeglass temple can better fit and encircle the back of the head, thereby further achieving the purpose of preventing falling.

Implementation 3

The present implementation is further improved based on Implementation 1 and Implementation 2, thereby achieving the effects of improving the strength and the service life. A solution is as follows: referring to FIG. 7 to FIG. 9, the terminal ends of the upper elastic piece 3 and the lower elastic piece 4 are integrally formed and extend to form a middle elastic piece 11 that is bent to the hollow area, forming a three-elastic-piece structure, that is to say, the middle elastic piece is integrally formed with the terminal ends of the upper elastic piece and the lower elastic piece, gaps are formed between the middle elastic piece 11 and the terminal ends of the upper elastic piece and the lower elastic piece, and a terminal end 12 of the middle elastic piece 11 abuts against an end surface of the elastic piece fixing end 6, forming a three-section elastic piece, which has higher reliability.

It should be pointed out that the deformable elastic piece in the solution adopts a stainless steel elastic piece, and the material has good hardness and elasticity and is suitable for repeated use at high frequency.

Meanwhile, it should be pointed out that orientation or position relationships indicated by terms proposed in the present disclosure, such as: "front", "back", "vertical", "horizontal", etc., are based on orientation or position relationships shown in the drawings and are only to facilitate the description of the present disclosure and simplify the description, rather than indicate or imply that a device or element referred to must have a specific orientation, be constructed and operate in a specific orientation, and therefore should not be understood as limitations to the scope of protection of the present disclosure.

The description above only shows preferred implementations of the present disclosure and is not intended to limit the present disclosure. Any modifications, equivalent substitutions, improvements and the like that are made within the spirit and principles of the present disclosure shall be included in the scope of protection of the present disclosure.

What is claimed is:

1. An encircling eyeglass temple with a deformation structure, comprising an eyeglass temple body, wherein the deformation structure is installed at one end of the eyeglass temple body, the deformation structure comprises an elastic piece, the elastic piece is provided with an elastic piece fixing end that is fixedly connected to the eyeglass temple body, an elastic plane, and an upper elastic piece and a lower elastic piece that are arranged along the elastic plane, a hollow area is formed between the upper elastic piece and the lower elastic piece, terminal ends of the upper elastic piece and the lower elastic piece are connected, an externally convex and inwardly concave arc-shaped area serving as a deformation area under an external force is formed between the upper elastic piece and the lower elastic piece, and the elastic piece is sleeved with a tip;

wherein the terminal ends of the upper elastic piece and the lower elastic piece are intersected and are installed and fixedly connected through a fixing member;

wherein cross-sections of the upper elastic piece and the lower elastic piece located on the hollow area are in a symmetrical structure and are of an anti-falling reinforcement structure;

the externally convex and inwardly concave arc-shaped area is utilized to allow the upper elastic piece and the lower elastic piece to simultaneously perform deformation actions outward or inward, thereby achieving the purpose of deformation in need.

2. The encircling eyeglass temple with a deformation structure according to claim 1, wherein the elastic piece fixing end is connected to the eyeglass temple body through fasteners, and a plurality of convex rings are also installed at the elastic piece fixing end.

3. The encircling eyeglass temple with a deformation structure according to claim 1, wherein the fixing member adopts a threaded structural member.

4. The encircling eyeglass temple with a deformation structure according to claim 1, wherein the fixing member adopts a riveting member.

5. The encircling eyeglass temple with a deformation structure according to claim 1, wherein the elastic piece fixing end, the elastic plane, the upper elastic piece, and the lower elastic piece are all integrally formed by machining.

6. The encircling eyeglass temple with a deformation structure according to claim 1, wherein both the upper elastic piece and the lower elastic piece adopt an arc-shaped structure, forming an encircling structure capable of encircling the back of the head.

7. The encircling eyeglass temple with a deformation structure according to claim 1, wherein the terminal ends of the upper elastic piece and the lower elastic piece are integrally formed and extend to form a middle elastic piece that is bent to the hollow area, forming a three-elastic-piece structure.

\* \* \* \* \*